United States Patent
von zur Muehlen et al.

(10) Patent No.: US 11,043,344 B2
(45) Date of Patent: Jun. 22, 2021

(54) ARC FLASH REDUCTION MAINTENANCE SYSTEM WITH PYROTECHNIC CIRCUIT PROTECTION MODULES

(71) Applicant: EATON INTELLIGENT POWER LIMITED, Dublin (IE)

(72) Inventors: Patrick Alexander von zur Muehlen, Wildwood, MO (US); Michael Henricks, Ellisville, MO (US); Vinicius Marcilli Petroni, Wildwood, MO (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 345 days.

(21) Appl. No.: 15/986,966

(22) Filed: May 23, 2018

(65) Prior Publication Data

US 2019/0363532 A1 Nov. 28, 2019

(51) Int. Cl.
*H01H 39/00* (2006.01)
*H02H 3/08* (2006.01)
(Continued)

(52) U.S. Cl.
CPC ...... *H01H 39/006* (2013.01); *H01H 85/0241* (2013.01); *H01H 85/38* (2013.01);
(Continued)

(58) Field of Classification Search
CPC ........ H02H 3/08; H01H 39/00; H01H 39/006; H01H 39/002; H01H 39/008;
(Continued)

(56) References Cited

U.S. PATENT DOCUMENTS 3,949,340 A * 4/1976 Humphreys ....... H01H 85/0456
337/159
4,029,921 A 6/1977 Rich et al.
(Continued)

FOREIGN PATENT DOCUMENTS

DE 10049071 A1 4/2002
DE 102009023801 A1 2/2010
(Continued)

OTHER PUBLICATIONS

International Search Report and Written Opinion of the International Searching Authority regarding PCT/US2017/029547 dated Jul. 24, 2017, pp. 1-16.
(Continued)

*Primary Examiner* — Harry R Behm
(74) *Attorney, Agent, or Firm* — Armstrong Teasdale LLP

(57) ABSTRACT

An embodiment of an arc flash reduction maintenance system includes a pyrotechnic disconnect module and an overcurrent protection device connected to the pyrotechnic disconnect module. A control line is connected to the at least one pyrotechnic disconnect module and in parallel with one of the pyrotechnic disconnect module and the overcurrent protection device. The control line provides a self-generating control signal to cause the pyrotechnic disconnect module to electrically isolate the overcurrent protection device. A switch is located in the control line to selectively enable or disable at least one arc flash reduction maintenance system mode in the control line.

7 Claims, 7 Drawing Sheets

(51) Int. Cl.
*H01H 85/38* (2006.01)
*H01H 89/00* (2006.01)
*H01H 85/02* (2006.01)

(52) U.S. Cl.
CPC .............. *H01H 89/00* (2013.01); *H02H 3/08* (2013.01); *H01H 39/00* (2013.01)

(58) Field of Classification Search
CPC ........... H01H 2039/008; H01H 39/004; H01H 33/045; H01H 85/0241; H01H 85/38; H01H 89/00
See application file for complete search history.

(56) References Cited

U.S. PATENT DOCUMENTS

| | | | |
|---|---|---|---|
| 4,183,003 A | 1/1980 | Cleveland | |
| 4,646,640 A | 3/1987 | Florin et al. | |
| 4,920,446 A * | 4/1990 | Pflanz | H01H 39/006 337/30 |
| 4,944,697 A | 7/1990 | Dorman | |
| 5,969,932 A | 10/1999 | Ryan et al. | |
| 7,203,040 B2 | 4/2007 | Shipp et al. | |
| 2005/0040252 A1 | 2/2005 | Thomann | |
| 2005/0190525 A1 | 9/2005 | Jennings | |
| 2005/0285819 A1 * | 12/2005 | Onozawa | G09G 3/2965 345/67 |
| 2006/0049027 A1 | 3/2006 | Iversen | |
| 2007/0063808 A1 | 3/2007 | Darr et al. | |
| 2008/0137253 A1 | 6/2008 | George et al. | |
| 2009/0315664 A1 | 12/2009 | Crane | |
| 2012/0127621 A1 | 6/2012 | Knapp et al. | |
| 2013/0207769 A1 | 8/2013 | Faltermeier et al. | |
| 2013/0269746 A1 | 10/2013 | Ramsey | |
| 2016/0189905 A1 | 6/2016 | Lanning | |
| 2016/0225558 A1 | 8/2016 | Chatroux et al. | |
| 2017/0004947 A1 | 1/2017 | Hong et al. | |
| 2017/0330714 A1 | 11/2017 | Von Zur Muehlen et al. | |
| 2018/0277325 A1* | 9/2018 | De Palma | H01H 9/106 |

FOREIGN PATENT DOCUMENTS

| | | |
|---|---|---|
| DE | 202010004061 U1 | 6/2010 |
| DE | 102011014343 A1 | 9/2012 |
| DE | 102012022083 A1 | 5/2014 |
| EP | 2293345 A2 | 3/2011 |
| FR | 3014594 A1 | 6/2015 |
| GB | 2489101 A | 9/2012 |

OTHER PUBLICATIONS

European Search Report and Written Opinion regarding European Patent Application No. 17170514.8-1808 dated Jul. 24, 2017, pp. 1-9.

* cited by examiner

ARC FLASH REDUCTION MAINTENANCE SYSTEM WITH PYROTECHNIC CIRCUIT PROTECTION MODULES

BACKGROUND OF THE INVENTION

The field of the invention relates generally to electrical circuit protector systems and methods, and more specifically to arc flash reduction maintenance systems methods for circuit protectors and pyrotechnic device combinations.

Circuit protectors such as fuses are widely used as overcurrent protection devices to prevent costly damage to electrical circuits. Fuse terminals typically form an electrical connection between an electrical power source and an electrical component or a combination of components arranged in an electrical circuit. One or more fusible links or elements, or a fuse element assembly, is connected between the fuse terminals, so that when electrical current flowing through the fuse exceeds a predetermined limit, the fusible elements melt and open one or more circuits through the fuse to prevent electrical component damage.

Electrical power system personnel sometimes need to perform maintenance procedures in energized portions of an electrical power system, such as an electrical panel that includes circuit protectors such as fuses, which are susceptible to electrical arcing conditions. Arc Flash Reduction Maintenance Systems exist to reduce a severity of electrical arcing and arc flash conditions for improved safety of electrical system personnel as well as to enhance circuit protection in the electrical power system via circuit protectors. Conventional Arc Flash Reduction Maintenance Systems remain disadvantaged in some aspects, however, that to date have limited their use. Improvements are desired.

BRIEF DESCRIPTION OF THE DRAWINGS

Non-limiting and non-exhaustive embodiments are described with reference to the following Figures, wherein like reference numerals refer to like parts throughout the various views unless otherwise specified.

DETAILED DESCRIPTION OF THE INVENTION

Figure 1:
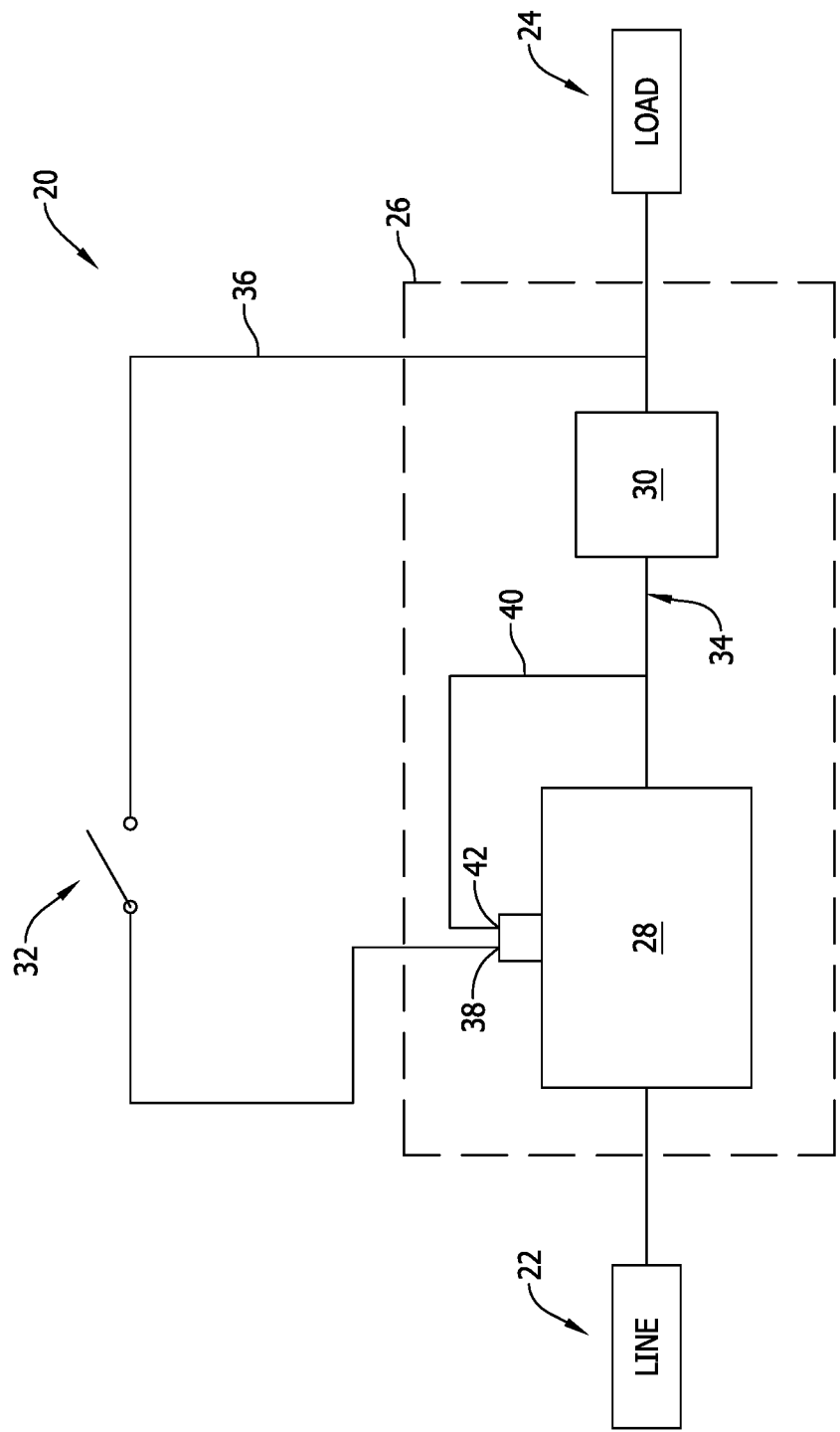
FIG. 1 is a circuit schematic of a first portion of an electrical power system including an exemplary Arc Flash Reduction Maintenance System according to the present invention.

Arc Flash Reduction Maintenance Systems for use in performing maintenance and service procedures in energized electrical power systems are known but are rather limited in certain aspects for certain applications.

Pyrotechnic circuit protection devices are sometimes utilized in combination with circuit protectors in certain types of known Arc Flash Reduction Maintenance Systems. Pyrotechnic circuit protection devices include connecting terminals connection and pyrotechnic disconnect element that releases energy to disconnect the terminals inside the device. The pyrotechnic disconnect element may include stored chemical, electrical or mechanical energy that is released via actuation of a pyrotechnic charge to sever an electrical connection between the terminals of the device. As such, pyrotechnic circuit protection devices are sometimes referred to as pyrotechnic disconnects or pyrotechnic switches. Once activated, such devices can electrically isolate load-side circuitry from line-side circuitry through the pyrotechnic circuit protection device when predetermined fault conditions occur in the line-side circuitry and prevent possible damage to load-side circuitry that the fault condition may otherwise present, as well as to reduce or mitigate electrical arcing energy. Pyrotechnic circuit protection devices are advantageous for their quick and reliable operation regardless of the energy (voltage and current) in the circuit completed through the device when fault conditions are identified. This is because the energy needed to open the device comes from a chemically stored source in the pyrotechnic unit rather than the energy of the circuit fault (as in fusible circuit protector) or from stored mechanical energy (as in conventional circuit breaker devices).

For purposes of Arc Flash Reduction Maintenance Systems, pyrotechnic circuit protection devices may advantageously provide a faster response time to certain fault conditions than the circuit protectors otherwise provide, and therefore can reduce electrical arcing potential and arc flash severity that may relate to certain types of electrical fault conditions. Pyrotechnic circuit protection devices may be particularly beneficial in combination with a circuit protector such as a fuse that may be undesirably slow to respond to certain fault conditions.

As conventionally implemented, however, pyrotechnic circuit protection devices tend to be custom designed for specific applications and as such are prohibitively expensive for some applications and impractical for others. In particular, pyrotechnic circuit protection devices require a control signal in order to activate the pyrotechnic disconnect elements. As a result, conventionally implemented, Arc Flash Reduction Maintenance Systems typically entail current sensors and the like to monitor actual circuit conditions and external controllers receiving inputs from the sensors and providing the appropriate control signals in response to predetermined circuit conditions that are detected. The current sensing and control features needed for the pyrotechnic devices add further customization, cost and complexity to implementing a conventional Arc Flash Reduction Maintenance Systems, rendering them impractical for some applications.

Exemplary embodiments of the present invention are described below that beneficially overcome these and other disadvantages in the art. As explained in detail below, Arc Flash Reduction Maintenance Systems are proposed for use in combination with modular pyrotechnic circuit protection devices that provide an easily configurable, modular system that may be readily used with standard fuses, terminals, controllers and other components to meet a wide variety of circuit protection specifications and needs at relatively low cost and with general compatibility with established circuit protection fuse classes and related devices. Customization of pyrotechnic devices is therefore avoided with simplified control schemes and flexibility of arranging and controlling disconnect elements in a cost effective manner. Method aspects will be in part apparent and in part explicitly discussed in the description below.

FIG. 1 schematically illustrates an exemplary Arc Flash Reduction Maintenance System 20 operative in a portion of an electrical power system. The power system includes power supply or line-side circuitry 22 feeding electrical power to receiving or load-side circuitry 24 through a panelboard 26 that includes a pyrotechnic disconnect assembly 28 and an overcurrent protection device 30. In contemplated embodiments, the overcurrent protection device 30 may be a fuse, a current limiter, a circuit breaker, or another circuit protector or component that is subject to electrical arcing conditions in use or during maintenance and service procedures in and around the vicinity of the panelboard 26.

While FIG. 1 illustrates one circuit protector 30 and one pyrotechnic disconnect assembly 28, it is understood that the panelboard 26 may include any number of circuit protectors 30 and any number of pyrotechnic disconnect assemblies 28. Also, while illustrated in the context of a panelboard 26, the Arc Flash Reduction Maintenance System 20 does not necessarily require a panelboard and can be used at other locations in the power system where workers are performing maintenance and service procedures in and around energized electrical conductors and components. Finally, while both the circuit protector 30 and the pyrotechnic disconnect assembly 28 are shown in the panelboard 26, the pyrotechnic disconnect assembly 28 could be separately provided form the panelboard as part of the line-side circuitry. As such, numerous variations are possible in the locations of the circuit protector and the pyrotechnic disconnect assembly 28, so long as they can be connected to function as described herein.

As shown in FIG. 1, the pyrotechnic disconnect assembly 28 and the overcurrent protection device 30 are connected in series between the line-side circuitry 22 and the load-side circuitry 24, and a switch 32 is connected in a parallel circuit path to the pyrotechnic disconnect assembly 28 and the overcurrent protection device 30. The switch 32 is operable to open and close a control signal path to the pyrotechnic disconnect assembly 28 and therefore disable or enable Arc Flash Reduction Maintenance System functionality.

As further shown in FIG. 1, a first pyrotechnic disconnect control line 36 is connected to a load side terminal of the circuit protection device 30 and provides a control signal path from the circuit protection device to the switch 32. The control line 36 is further connected from the switch 32 to a first control terminal 38 of the pyrotechnic disconnect assembly 28. Likewise, a second control line 40 connects is connected to a second control terminal 42 of the pyrotechnic disconnect assembly 28 and to the line-side terminal of the circuit protector. In combination, the control lines 36 and 40 provide a control path connected in parallel to the circuit protector 30 that includes the switch 32.

As depicted in FIG. 1, the switch 32 is in an open position, creating an open circuit between the circuit protector 30 and the pyrotechnic disconnect assembly 28 in the control line 36. As such, while switch 32 is open the pyrotechnic disconnect assembly 28 cannot operate or otherwise actuate in response to a fault condition because a control signal cannot reach the control terminal 38 of the pyrotechnic disconnect assembly 28. In the embodiment illustrated in FIG. 1, when the switch 32 is open, the overcurrent protection device 30 is responsive to overcurrent conditions while the pyrotechnic disconnect assembly 28 generally is not responsive, although depending on how the pyrotechnic disconnect assembly 28 is configured it may respond in part to certain overcurrent conditions before being actuated by a control signal to operate the disconnect elements provided.

In normal operation of the power system (i.e., when no electrical fault condition exists) and when switch 32 is closed, the pyrotechnic disconnect assembly 28 and overcurrent protection device 30 in combination provide a relatively low resistance circuit path between circuitry 22 and 24 and current flows freely from the line side circuitry 22 through the pyrotechnic disconnect assembly 28 and the overcurrent protection device 30 to the load side circuitry 24. When the current flowing through the circuit protection device 30 reaches a predetermined limit, the circuit protection device 30 opens the circuit path between the disconnect assembly 28 and the load side circuitry 24 in a known manner.

In the case wherein the circuit protection device 30 is an overcurrent protection fuse, when the current flowing through the fuse meets predetermined magnitude and time parameters that are engineered into the fuse element or fuse element assembly design, the fuse element (or fuse element assembly) inside the fuse melts or disintegrates and opens the circuit path between the circuitry 22 and 24. The current magnitude and times causing the fuse to open are represented by a time-current curve familiar to those in the art and available from fuse manufacturers so that appropriate fuses can be properly matched to the needs of the power system and loads being protected. In many cases, the circuit protection device 30 works quite well to interrupt fault conditions without assistance of the disconnect assembly 28.

In certain circumstances, however, the overcurrent protection fuse 30 may not respond as quickly as needed to certain electrical fault conditions that present arcing potential or corresponding arc flash potential. Therefore, and when the switch 32 is closed, the pyrotechnic disconnect assembly 28 is operable if needed to quickly actuate and open the circuit between the line and load, and also through the circuit protection device 30, at a time before the overcurrent protection fuse 30 is otherwise able to fully respond. The control line 36 establishes a relatively high resistance path in parallel to the circuit protection fuse, such that in normal operation of the power system currently generally does not flow in the control line 36 and the entire current passes through the circuit protection device 30 to the load side circuitry 124.

When an electrical fault condition occurs, however, the overcurrent protection fuse 30 exhibits an increased electrical resistance, causing some of the current flowing through the circuit protector to flow in the control line 36, thereby driving a control current or signal through control line 36 that is passed through the closed switch 32 to the control terminal 38. The control signal, once received at the control terminal 38 causes the pyrotechnic element(s) to operate in the pyrotechnic disconnect assembly 28 and open the circuit path through the pyrotechnic disconnect assembly 28. As such, in the embodiment shown, the current signal to actuate the pyrotechnic element(s) in the assembly 38, as received through the control line 36, corresponds to a condition wherein the overcurrent protection fuse has reached an overload condition of arc flash potential, and therefore actuates the pyrotechnic disconnect assembly 28 to open the circuit through the disconnect assembly 28. The opening of the pyrotechnic disconnect assembly 28 isolates the circuit protection device 30, preventing any further increase in arc flash energy and causing any electrical arcing to quickly dissipate.

Notably, the arrangement shown and described in FIG. 1 does not require current monitoring and related current sensors, or an external controller and sophisticated processing of monitored circuit conditions to operate. Instead of a control signal being provided by a separately provided, separately powered component, the control signal is self-generated by the fault current itself, resulting in a much simplified control scheme. When the circuit protector fuse reaches a predetermined electrical resistance in a fault condition, current will naturally flow in the control line 36 and trigger operation of the pyrotechnic disconnect elements. The electrical fuse resistance and corresponding fault condition can be empirically tested or otherwise determined, and the resistance of the control line 36 can be selected to determine the proportion of the current that divides into the control line 36 and serves as the control signal to the pyrotechnic elements.

The Arc Flash Reduction Maintenance System 20 may accordingly be provided at relatively low cost while providing highly reliable Arc Flash Reduction Maintenance System functionality. Moreover, this arrangement allows pyrotechnic disconnect system 28 to be configured as a modular pyrotechnic circuit protection assembly that may be easily assembled in various different configurations to meet the needs of a variety of applications with a small number of standardized components for more or less universal use with different circuit protectors and different power systems.

Figure 2:
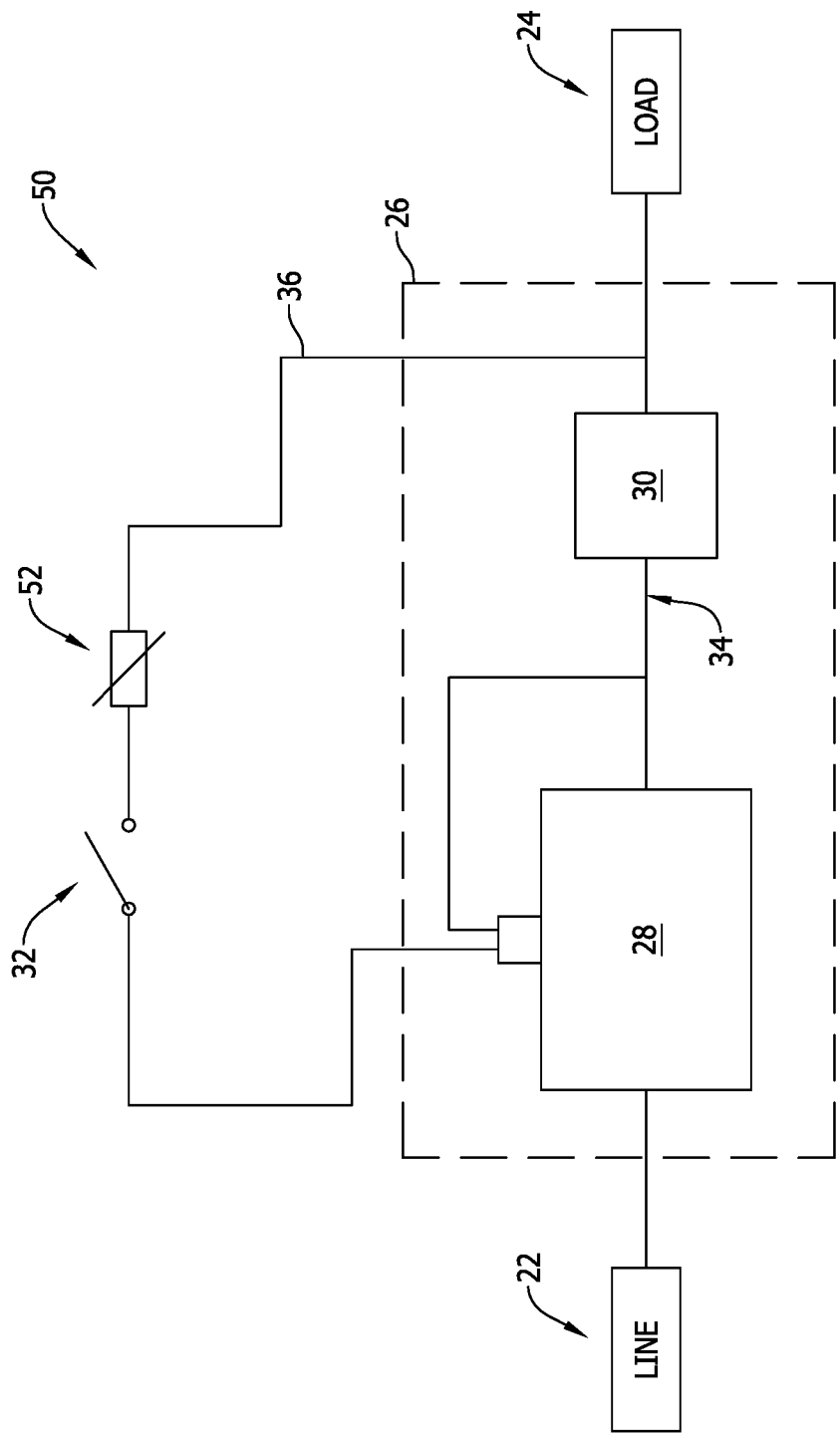
FIG. 2 is a circuit schematic of a second exemplary Arc Flash Reduction Maintenance System according to the present invention.

FIG. 2 schematically illustrates another embodiment of an Arc Flash Reduction Maintenance System 50 including the pyrotechnic disconnect assembly 28 and the overcurrent protection device 30, the switch 32 opening and closing the control line 36, and a control signal circuit component 52 in the control line 36 and in series with the switch 32. The Arc Flash Reduction Maintenance System 50 operates similarly to the system 20 described in FIG. 1, with the control signal circuit component 52 affecting the control signal that is received by the pyrotechnic disconnect assembly 28.

In contemplated embodiments, the control signal circuit component 52 may be a varistor, a high pass filter, a low pass filter, a resistor, a breakdown capacitor, a Zener diode, an insulated gate bipolar transistor (IGBT) or any control signal circuit component of combination of control signal circuit component that enables Arc Flash Reduction Maintenance System 50 to function as described herein. The addition of control signal circuit component 52 changes the operating characteristics of Arc Flash Reduction Maintenance System 50 when compared to Arc Flash Reduction Maintenance System 20 by modifying the presence or characteristics of the control signal in the control line 36 when generated while the switch 32 is closed.

For example, considering a scenario wherein the control signal circuit component 52 is a varistor, the varistor may pass the current through the switch 32 when closed only when the voltage across the circuit protection device 30, as determined via the control lines 36 and 40 connected in parallel to the overcurrent protection device 30, is below the predetermined operating voltage of the varistor. When the voltage of the circuit protection device 30 exceeds a threshold value that is predetermined in the varistor construction, the varistor provides a shunt current path to ground and prevents current from flowing through the control line 36 any further. Therefore, the varistor may pass certain currents through the control line while blocking others, causing the pyrotechnic disconnect assembly 28 to respond to some conditions and not others.

Likewise, if the control signal circuit component 52 is a high pass filter or low pass filter, only currents in specified ranges will pass through the control line 36 for possible actuation of the pyrotechnic disconnect assembly 28. The high pass filter or low pass filter varistor may accordingly pass certain currents through the control line 36 while blocking others, causing the pyrotechnic disconnect assembly 28 to respond to some conditions and not others.

If the control signal circuit component 52 is a resistor or a resistor network, the magnitude of the current flowing in the control line 36 to the pyrotechnic disconnect assembly 28 may be varied.

A breakdown capacitor, a Zener diode, an insulated gate bipolar transistor (IGBT) or other known elements or equivalents may likewise be employed as the control signal circuit component 52 to provide different control signal effects and causing different responses of, the pyrotechnic disconnect assembly 28.

In contemplated, embodiments, more than one of the control signal circuit component 52 may be provided in the control line 36 to obtain still further control signal effects. Control signal circuit components other than those described above may likewise be employed as needed or as desired.

Figure 3:
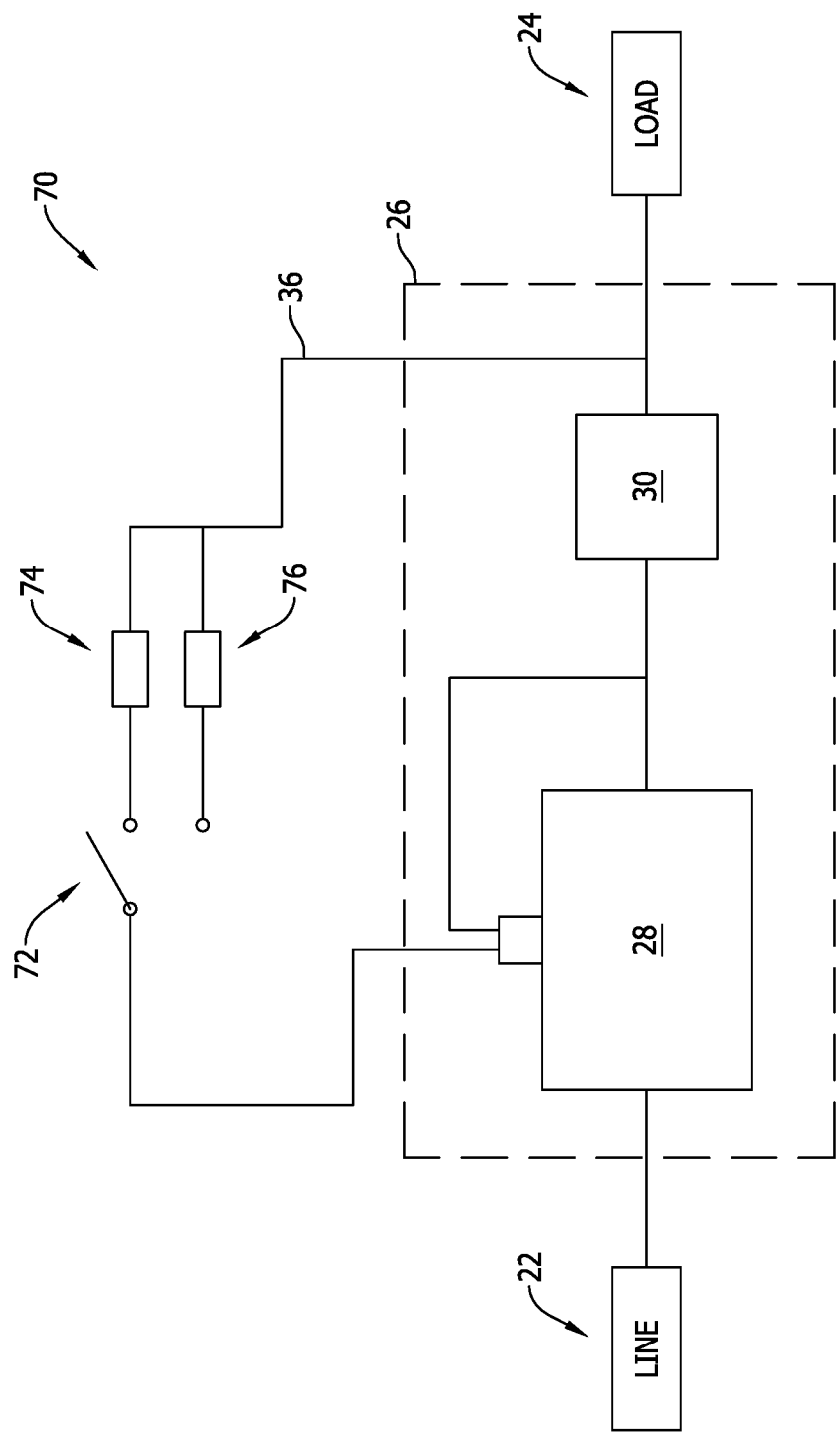
FIG. 3 is a circuit schematic of a third exemplary Arc Flash Reduction Maintenance System according to the present invention.

FIG. 3 schematically illustrates an Arc Flash Reduction Maintenance System 70 that is similar to the system 50 shown in FIG. 2 but includes a switch 72 and first and second control signal circuit components 74 and 76. The switch 72 is positionable between an open position, a first closed position connecting control signal circuit component 74 and a second closed position connected control signal circuit component 76. The control signal circuit components 74 and 76, jointly or separately, may a varistor, a high pass filter, a low pass filter, a resistor, a breakdown capacitor, a Zener diode, an insulated gate bipolar transistor (IGBT) or any control signal circuit component of combination of control signal circuit component that enables Arc Flash Reduction Maintenance System 70 to function as described herein.

The control signal circuit components 74 and 76 can be selectively switched on or off to provide different modes of Arc Flash Reduction Maintenance System functionality and responsiveness that may be appropriately selected depending on the particulars of the circuitry 22 and 24, the particulars of pyrotechnic disconnect assembly 28 and the circuit protection device 30, or particular issues posed by specific service or maintenance procedures being performed. For example, the Arc Flash Reduction Maintenance System 70 may operate in reference to a first voltage range with the switch in the first position and with reference to a second voltage range with the switch in the second position, or in response to different high or low pass filters. Numerous variations are possible in this regard to provide selectable modes of operation of the Arc Flash Reduction Maintenance System 70.

In some embodiments, the switch 72 can be associated with a user input or interface for facilitating the connection of either elements 74 and 76. In other embodiments any number of control signal circuit components and selectable connections can be any number to enable Arc Flash Reduction Maintenance System 70 to function as described herein. While two control signal circuit components 74 and 76 are illustrated in FIG. 3, more than two control signal circuit components are possible in further and/or alternative embodiments.

Figure 4:
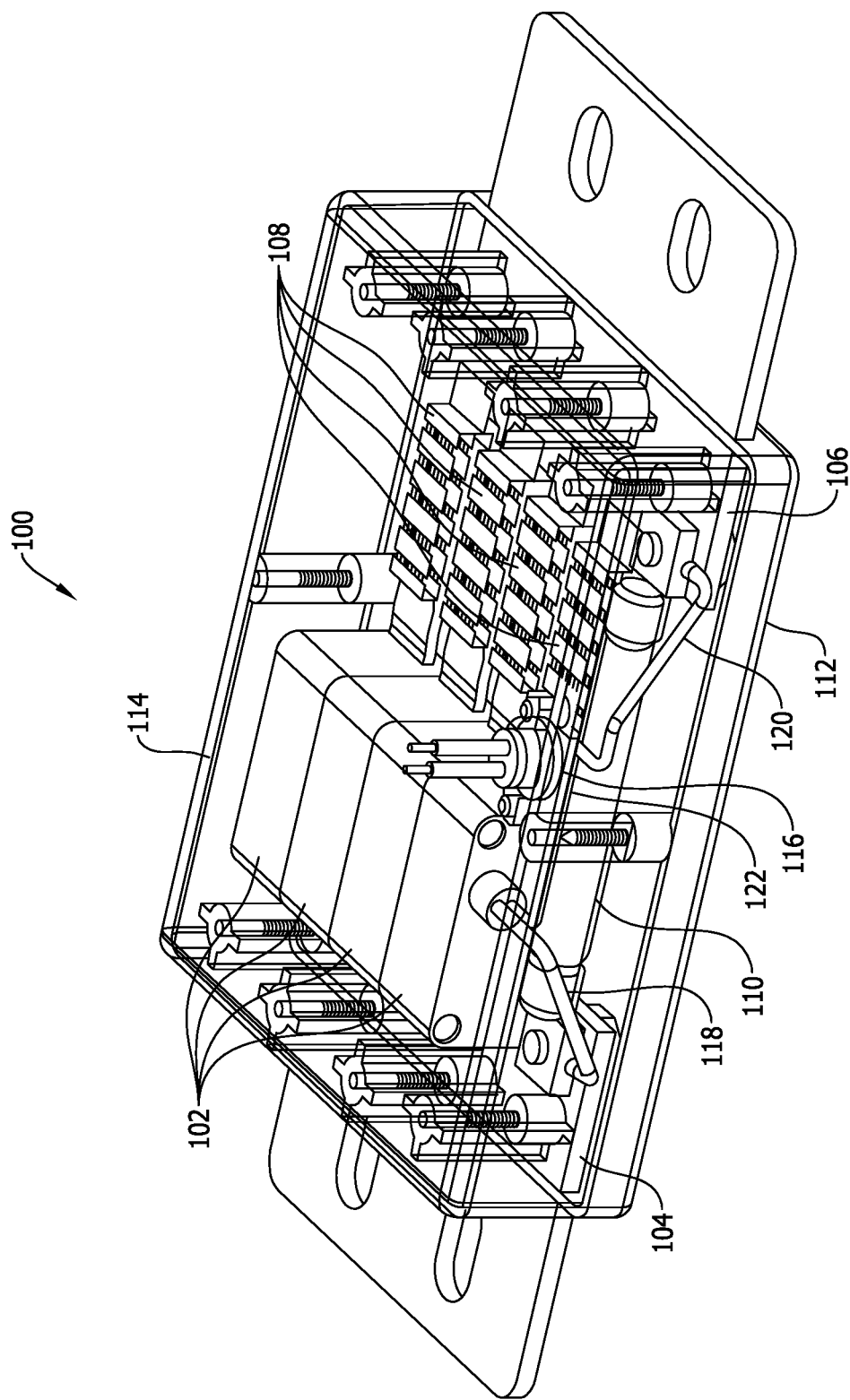
FIG. 4 is a perspective view of an exemplary embodiment of a pyrotechnic circuit protection system according to the present invention.

FIG. 4 is a perspective view of a first exemplary embodiment of pyrotechnic disconnect assembly 100 that may be used as the pyrotechnic disconnect assembly 28 in the systems described in FIGS. 1-3. The pyrotechnic circuit protection system 100 includes a plurality of pyrotechnic disconnect modules 102. The disconnect modules 102 are positioned side-by-side and are mechanically and electrically interconnected by a respective female connector (depicted in FIG. 7A) of the module 102 and a male connector (depicted in FIG. 7B) of the module 102 with plug-in connections to establish control connections to each module 102 provided. The modules 102 are shown are connected in parallel to one another between terminals 104 and 106 shown in the illustrated example as bus bars.

Bus bar 104 is connected to line-side terminals of the modules 102 via bolted connections. Load-side terminals of the modules 102 are connected to bus bar 106 via respective current limiters 108 and bolted connections. As depicted, each module 102 is connected in series with each current limiter 108 between the bus bars 104, 106. The bus bar 104 may be connected to line-side or power supply circuitry 22 and the bus bar 106 may be connected to the load-side circuit protection device 30 and the load side circuitry 24 as shown in FIGS. 1-3. In other embodiments terminals other than bus bars are contemplated and may be utilized to make such connections, including terminal screw connectors, soldered connections, brazed connections or other connection techniques known in the art using known fasteners and the like.

The current limiters 108 may each be configured as a bare fuse element including a perforated metal strip extending between each disconnect module 102 and the bus bar 106. Each perforated strip includes a plurality of layers such that the various layers are spaced apart from one another, such that current divides across the layers as it flows to the bus bar 106. Each of the layers has a body that defines a plurality of linear arrangements of perforations, with each linear arrangement extending across the body in the widthwise dimension, and with the various linear arrangements being spaced apart from one another along the body in the lengthwise dimension. The current limiters 108 can be surrounded by arc extinguishing media such as sand or any other arc quenching feature to dissipate electrical arcing potential around the current limiters 108.

The pyrotechnic circuit protection assembly 100 also includes a high voltage, low amperage fuse 110 connected in parallel to the modules 102 and current limiters 108 for arc quenching purposes when the pyrotechnic circuit protection system 100 is activated to disconnect an electrical connection between the bus bars 104, 106. The fuse 110 includes an arc extinguishing media or other arc quenching feature to dissipate electrical arcing potential inside the fuse 110 as the fusible element therein opens. By this arrangement, the pyrotechnic disconnect modules 102 need not necessarily include arc mitigation features. Instead, fuse 110 can include arc mitigation features. Current limiters 108 can also include arc mitigation features or themselves be surrounded by arc extinguishing media.

In normal operation, when no electrical fault condition exists, the pyrotechnic circuit protection assembly 100 provides a low resistance path between its bus bars 104, 106 which include respective terminals and between the line and load circuitry. The fuse 110, however, exhibits a relatively higher electrical resistance, and as such very little current will flow through the fuse 110 in normal conditions. Instead, almost all of the current in normal conditions will flow through the disconnect modules 102 and limiters 108. Depending on the circuitry being protected and its electrical arcing potential, the fuse 110 may in some instances be considered optional and may be omitted in the pyrotechnic circuit protection system 100.

A housing base 112 and housing cover 114 may be provided as shown to protect the components of the pyrotechnic circuit protection assembly 100 when interconnected as shown. The base 112 defines a receptacle sized and dimensioned to receive the pyrotechnic modules 102, the current limiters 108 and the arc mitigation fuse 110. The cover 114 in the example shown includes an aperture through which a cable 116 may pass. The cable 116 can be associated with an electrical connector located on the cover 114. The cover 114 may in some embodiments be transparent. In other embodiments, the cover 114 may be color coded to convey to a person the type of disconnect modules 102 included without having to open the cover 114 for inspection. While an exemplary housing is shown and described, other variations of housings are possible and may be utilized as desired. In certain embodiments, the housing may be considered optional and may be omitted in the pyrotechnic circuit protection system 100.

The connectors of the modules 102 may be connected to one another and to the control lines 36 and 40 to implement the systems shown in FIGS. 1-3 wherein the resistance of the electrical fuse in a fault current condition drives a control signal to actuate the pyrotechnic elements provided. In the systems of FIGS. 1-3 the limiters 108 may be considered optional and need not be provided, and as few as one disconnect module 102 may serve to open the circuit through assembly 100.

FIG. 4 further depicts control wires 118, 120 and 122 in the assembly 100 that can alternatively be used to pass self-generated control signals to actuate the pyrotechnic elements in the disconnect modules 102 in reference to the current flowing through the assembly 28. Control wire 118 connects bus bar 104 on the side of line-side circuitry 22 to a male or female connector of pyrotechnic disconnect modules 102 (depicted in FIGS. 7A and 7B). Control wire 120 connects bus bar 106 on the side of load-side circuitry 24 to cable 116. Control wire 122 connects the male or female connector connected to control wire 118 to cable 116. This aforementioned configuration of control wires 118, 120, and 122 allow the pyrotechnic circuit protection system 100 to operate as pyrotechnic disconnect in an arc flash reduction maintenance system in a similar manner to those described above. In this case, and because the assembly 100 includes the limiters 108 that operate as circuit protectors themselves, the assembly 100 may be used as standalone Arc Flash Reduction Maintenance System in the absence of a separately provided circuit protection device 30, or in combination with a circuit protection device 130 as shown in FIGS. 1-3.

As depicted, the control wires 118, 120, and 122 are tapped through contacts before and after the modules 102 and current limiters 108. This allows the pyrotechnic circuit protection system 100 to operate and otherwise actuate in response to a fault condition. The cable may connect to an external control line including a switch and control line circuit components as described above. When the switch is closed, as a fault condition is reached, an electrical resistance of the current limiters 108 is increased, causing a current signal to flow in the control line and actuate the pyrotechnic element(s) in the modules 102 provided in the assembly 100. By virtue of the connected male and female connectors in the modules 102 the control signal in the control line may be passed to all of the modules 102, causing the pyrotechnic elements to actuate and thereby open the circuit path between the terminals associated with bus bars 104 and 106.

Figure 5:
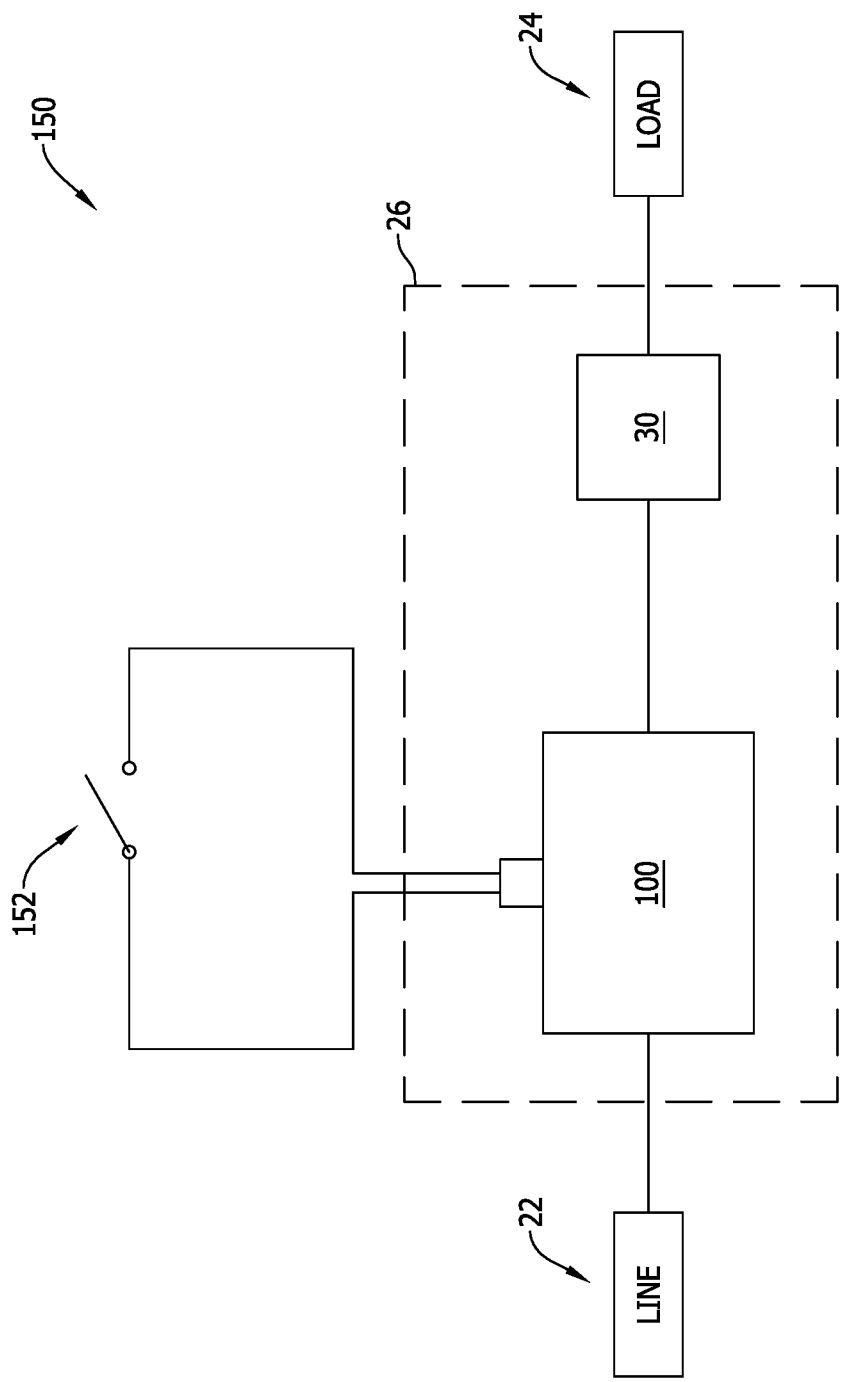
FIG. 5 is a circuit schematic of a fourth exemplary Arc Flash Reduction Maintenance System according to the present invention suitable for utilizing the pyrotechnic protection system of FIG. 4.

FIG. 5 schematically illustrates an Arc Flash Reduction Maintenance System including the pyrotechnic circuit protection assembly 100 and an overcurrent protection device 30. Arc Flash Reduction Maintenance System 150 also includes a switch 152 and control line path as shown. When switch 152 is closed, current running through current limiters 108 (depicted in FIG. 4) increases the resistance across current limiters 108 increases and drives current through the control line path and the control wire 120. This current through control wire 120 actuates pyrotechnic circuit protection system 100 when needed in a self-generated manner. Notably, Arc Flash Reduction Maintenance System 150 does not require the control path connected in parallel to the circuit protection device 130 as in the embodiments of FIGS. 1-3. The resistance of the current limiters 108 in the assembly 100 drives the actuation of the pyrotechnic circuit protection system 100 instead of the resistance of the circuit protection device 130 corresponding to a fault current.

Figure 6:
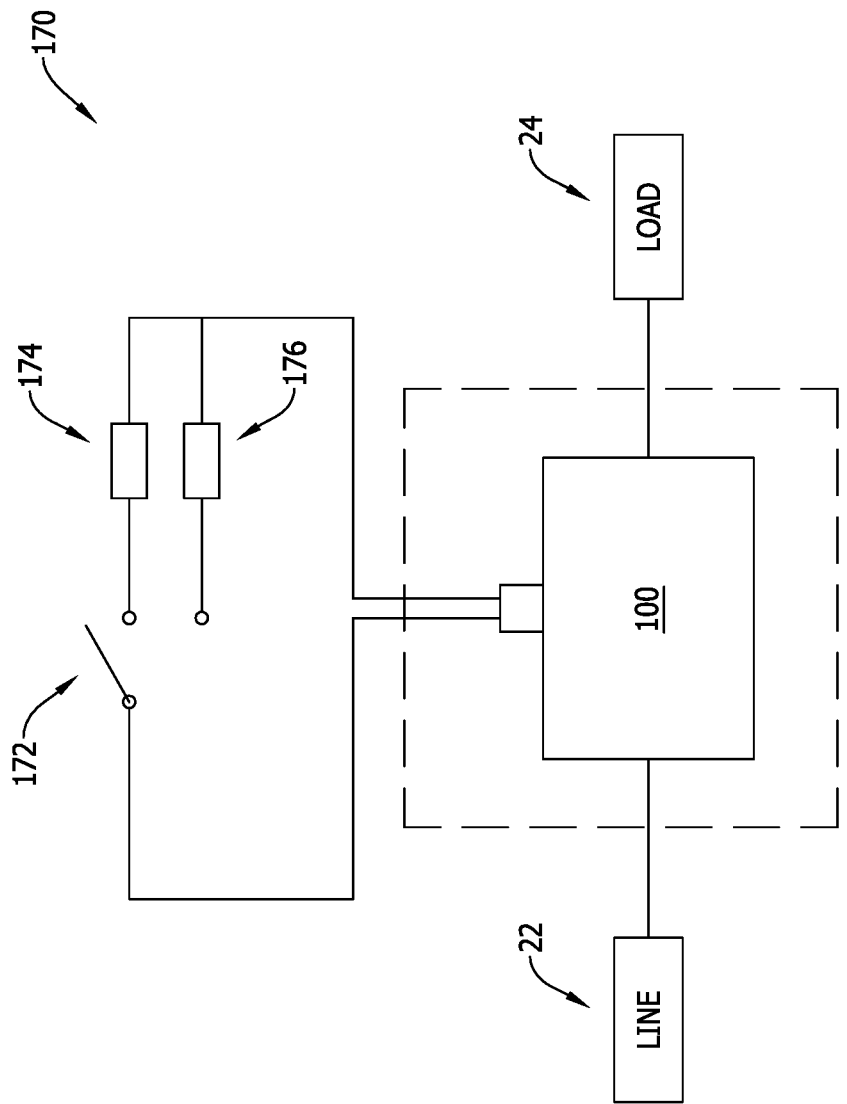
FIG. 6 is a circuit schematic of a fifth exemplary Arc Flash Reduction Maintenance System according to the present invention suitable for utilizing the pyrotechnic protection system of FIG. 4.

FIG. 6 schematically illustrates an Arc Flash Reduction Maintenance System 170 similar to FIG. 5 but including a switch 172 and control signal circuit components 174 and 176 in the control line. The switch is positionable between an open position, a first closed position connecting control signal circuit component 174 to the assembly 100, and a second closed position connecting control signal circuit component 176 to the assembly 100. The control signal circuit components 174 and 176, jointly or separately, may be configured as a varistor, a high pass filter, a low pass filter, a resistor, a breakdown capacitor, a Zener diode, an insulated gate bipolar transistor (IGBT) or any control signal circuit component of combination of control signal circuit component that enables Arc Flash Reduction Maintenance System 170 to functionally provide different modes of arc flash reduction responsiveness as described above. In some embodiments, switch 172 can be associated with a user input or user interface for facilitating the connection of either elements 174 and 176. While two control signal circuit components 174 and 176 are illustrated, more than two control signal circuit components are possible in further and/or alternative embodiments.

Figure 7A:
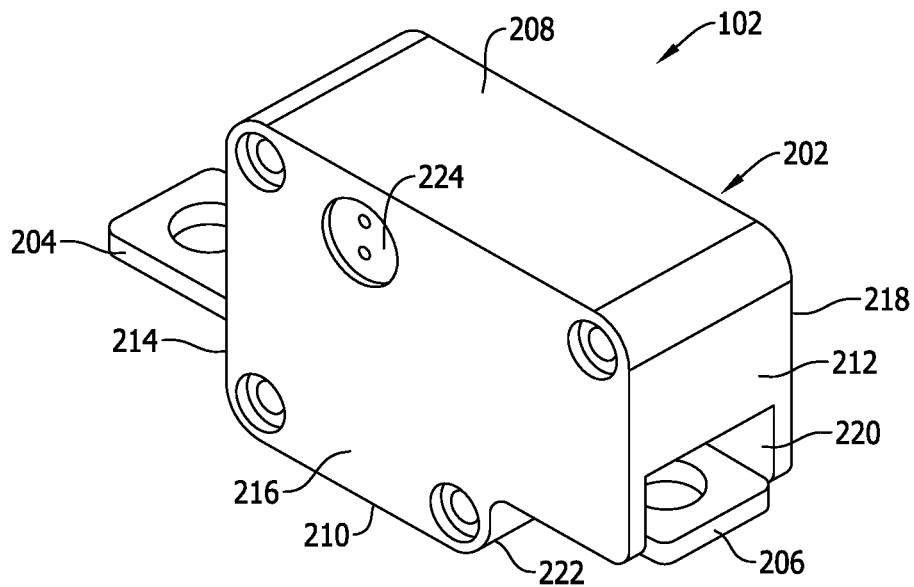
FIG. 7A is a first perspective view of an exemplary pyrotechnic circuit protection module for the Arc Flash Reduction Maintenance Systems of FIGS. 1-6.
Figure 7B:
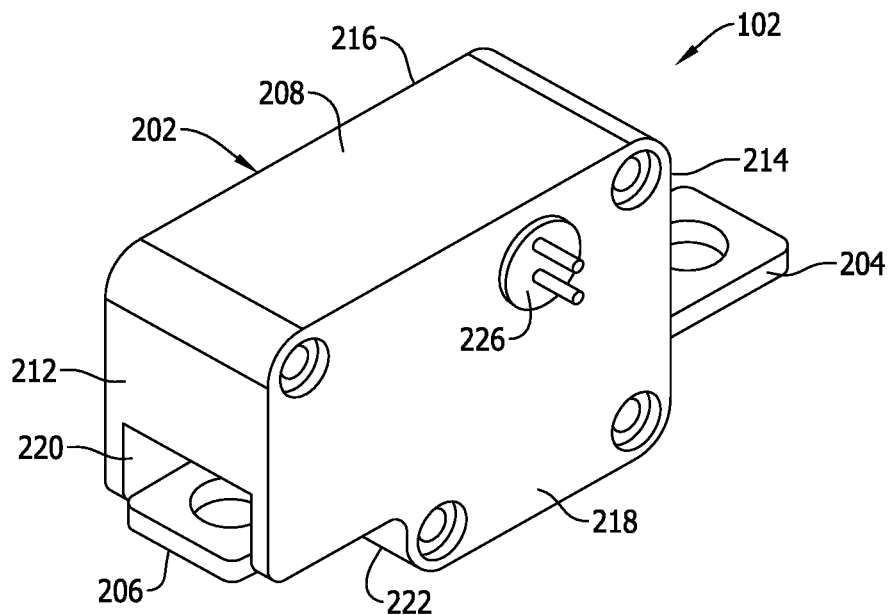
FIG. 7B is a second perspective view of the exemplary pyrotechnic circuit protection module shown in FIG. 7A.

FIGS. 7A and 7B are perspective views of a pyrotechnic circuit protection module 102 that may be utilized in the pyrotechnic disconnect assembly 100. The pyrotechnic disconnect module 102 generally includes a nonconductive housing 202 and first and second terminals 204, 206 extending from and exposed on opposing sides of the housing 202. The terminals 204, 206 provide a connection structure to external circuitry, and in the example shown the terminals 204, 206 are flat terminals including a mounting aperture that may provide, for example, connections to terminal studs of a power distribution block, or bolt-on connection to a another conductor. Other types of terminals known in the art may likewise be used instead in other alternative embodiments. Also, in other embodiments, the terminals 204, 206 instead of being the same type as in the example shown may be different types relative to one another. It is also understood that in another embodiment the terminals 204, 206 may project from or be exposed by other locations in the housing 202, including but not limited to an embodiment wherein the terminals 204, 206 extend from the same side of the housing 202.

In the example shown, the housing 202 has a generally rectangular shaped outer profile defined by a top face or surface 208, a bottom face or surface 210 opposing the top surface 208, lateral side faces or surfaces 212, 214, and longitudinal side faces or surfaces 216, 218. A recess 220 is formed adjacent the terminal 206 on the lateral surface 212 and a portion of the housing 202 overhangs the terminal 206 on the lateral side 212, while a clearance or cutout 222 is formed in the housing 202 beneath the terminal 206 on the lateral side 212. The terminal 204, however, projects away from the housing at the opposing side without an overhang or cutout formed in the housing 202 at the lateral side 214. The housing 202 accordingly has an asymmetrical shape in the example shown. Other geometric shapes and geometries, including symmetrical shapes, are possible in other embodiments.

As also shown in FIGS. 7A and 7B, the longitudinal sides 216, 218 of the pyrotechnic disconnect module 102 each include respective electrical connectors 224, 226 exposed thereon. In the example shown, the connector 224 is a female connector and the connector 226 is a male connector. The connectors 224, 226 in the illustrated example, generally oppose one another and are in-line with one another in the same location vis-à-vis the opposing sides 216, 218 of the pyrotechnic disconnect module 102. That is, the connectors 224, 226 are located at the same elevation and spacing from the respective sides 208, 214 of the housing 202. As such, aligned pyrotechnic disconnect modules 102 can be electrically connected to one another via the male connector 226 on a first pyrotechnic disconnect module 102 and a female connector 224 on a second pyrotechnic disconnect module 102 using a plug and socket-type engagement.

When the respective electrical connectors 224, 226 of two adjacent pyrotechnic disconnect modules 102 are joined and mated as in the example assemblies and systems described above, electrical interconnection of the pyrotechnic disconnect modules 102 is established for control and coordination purposes described above in various Arc Flash Reduction Maintenance Systems 20, 50, and 70; and pyrotechnic circuit protection system 100. While exemplary male and female connectors 226, 224 are shown at exemplary locations in the pyrotechnic disconnect module 102 and also while a two prong male connector 226 and a two aperture female connector 224 are provided, other types of male and female connectors 226 may be utilized in other embodiments, whether in the same or different locations on the housing 202, in other embodiments.

The electrical connector 224 and 226 in each pyrotechnic module 102 is electrically connected via the first male prong and the first mating aperture to a pyrotechnic disconnect element inside the module housing 202. The pyrotechnic disconnect element may be activated by control circuitry in the manner described above to release stored energy inside the module 102 in a known manner to open or disconnect a conductive circuit path between the terminals 204, 206. Generally, any known type of pyrotechnic element and associated type of energy storage element (e.g., chemical, electrical, mechanical) known in the art may be utilized inside the pyrotechnic disconnect module 102.

As used herein, the term "modular" shall refer not only employing or involving a module or modules as the basis of design or construction, but also refer to the relative positioning of various external features of the modules, such as electrical connectors, terminals, and openings, that enable a single module to interconnect mechanically and electrically with other modules 102. For example, in the case of pyrotechnic disconnect modules 102, connectors 224, 226 are located at the same elevation and spacing from the respective sides 208, 214 of the housing 202. This allows aligned disconnect modules 102 to be mechanically and electrically connected to one another via the male connector 226 on a first pyrotechnic disconnect module 102 and a female connector 224 on a second pyrotechnic disconnect module. The connectors being located on opposite sides of the housing enable the pyrotechnic disconnect modules 102 to be connected side-by-side in order to provide a modular assembly including any number of modules 102. By contrast, a device lacking modularity would not emphasize external features like electrical connectors 224 and 226. A device lacking modularity would also lack a number of identical components such as pyrotechnic circuit protection system 100 including a number of identical modules 102.

It should now be evident that still further variations of pyrotechnic disconnect assemblies may easily be assembled by adding or subtracting disconnect modules and varying the interconnections between them and the other elements described. Having now described the pyrotechnic disconnect assemblies 28 and 100 that utilize modules 102, those in the art may configure various Arc Flash Reduction Maintenance Systems utilizing differing pyrotechnic disconnect systems without further explanation.

Moreover, it should also be evident that further variations of Arc Flash Reduction Maintenance Systems may be easily assembled by rearranging the control lines and varying the interconnections between the pyrotechnic disconnect systems, the fuse or other circuit protection devices and the other elements described. Having now described the Arc Flash Reduction Maintenance Systems 20, 50, 70, 150, and 170, those in the art may configure various Arc Flash Reduction Maintenance Systems without further explanation.

Relative to existing Arc Flash Reduction Maintenance Systems, the disclosed Arc Flash Reduction Maintenance Systems, pyrotechnic disconnects, pyrotechnic control modules and configurable systems including the same facilitate a desirability and expanded use of pyrotechnic disconnect features in at least the following aspects.

The configurable pyrotechnic circuit protection system of the invention readily facilitates the use of pyrotechnic disconnection features in Arcflash Reduction Maintenance Systems without customized circuit monitoring and control schemes for each desired application. Various different Arc Flash Reduction Maintenance Systems of the invention, including but not limited to the examples above, are easily configurable for many applications with a small number of standard modular devices and modular components. A large variety of different systems can be assembled that meet various different needs for particular applications without customization and related expenses and difficulty. The configurable pyrotechnic circuit protection systems of the invention with modular components reduces, if not eliminates, a need to develop a new pyrotechnic disconnect features for new and different applications that may be desired.

The modular pyrotechnic components provide advantageous economies of scale that reduce costs of providing pyrotechnic disconnect features, as well as simplifies inventories of parts needed to provide a full spectrum of systems for a vast variety of different applications presenting different needs.

The use of pyrotechnic disconnect features in the proposed systems advantageously facilitates circuit protection systems operable with lower resistance for fusible applications. Consequently, the systems of the inventions are operable with lower Watts loss, cooler operation, and improved cycle/fatigue life for fusible applications The systems facilitate management and coordination of multi-phases of multi-phase power systems, and eliminate undesirable single phase disconnection events in the multi-phase power system.

The built-in control functionality of the pyrotechnic actuation of the invention provides easy and convenient interconnection capability that reduces installation costs and complexity of otherwise individually installed and stand-alone pyrotechnic circuit protection devices. The self-generating control signals eliminate a need for circuit monitoring sensing and signal processing by a separate controller, saving time and expense of acquisition and installations while avoiding reliability issues that sensors and feedback controls may present.

The benefits and advantages of the inventive concepts are now believed to have been amply illustrated in relation to the exemplary embodiments disclosed.

An embodiment of an arc flash reduction maintenance system has been disclosed including a pyrotechnic disconnect module, an overcurrent protection device connected to the pyrotechnic disconnect module, and a control line connected to the at least one pyrotechnic disconnect module and in parallel with one of the pyrotechnic disconnect module and the overcurrent protection device. The control line provides a self-generating control signal to cause the pyrotechnic disconnect module to electrically isolate the overcurrent protection device, and a switch is located in the control line to selectively enable or disable at least one arc flash reduction maintenance system mode in the control line.

Optionally, the overcurrent protection device may be an overcurrent protection fuse. When the switch is closed and the resistance of the fuse increases to a predetermined value in a fault current condition, the self-generating control signal is presented in the control line. The control line may include at least a first control signal circuit component, and the at least one control signal circuit component may be selected from the group of: a varistor, a high pass filter, a low pass filter, a resistor, a breakdown capacitor, Zener diode, an insulated gate bipolar transistor (IGBT) or equivalents and combinations thereof. The control line may also include at least a second control signal circuit component, the switch being operable to connect and disconnect each of the first and second control signal circuit components in the control line to provide respectively different arc flash reduction maintenance system modes.

The at least one pyrotechnic disconnect module may also include a plurality of disconnect modules connected in parallel to one another. The overcurrent protection device may be connected in series with the pyrotechnic disconnect module, and the control line may be connected in parallel with the overcurrent protection device.

As another option, a current limiter may be connected in series with the at least one pyrotechnic disconnect module. When the switch is closed and the resistance of the current limiter increases to a predetermined value, the self-generating control signal may be presented in the control line. The control line may also include at least a first control signal component selected from the group of a varistor, a high pass filter, a low pass filter, a resistor, a breakdown capacitor, a Zener diode, an insulated gate bipolar transistor (IGBT), or equivalents and combinations thereof.

Another embodiment of an arc flash reduction maintenance system has also been disclosed including a pyrotechnic disconnect assembly. The pyrotechnic disconnect assembly includes a housing, first and second terminals extending from an exterior of the housing, and a plurality of pyrotechnic disconnect modules inside the housing and connected in parallel between the first and second terminals. Each of the plurality of pyrotechnic disconnect modules includes first and second electrical connectors, and a pyrotechnic disconnect element electrically connected to at least one of the first and second electrical connectors. A control line is connected to one of plurality of pyrotechnic disconnect modules and in parallel with one of pyrotechnic disconnect assembly and the overcurrent protection device. The control line provides a self-generating control signal to cause the pyrotechnic disconnect module to electrically isolate the overcurrent protection device.

Optionally, the system may include a switch located in the control line to selectively enable or disable at least one arc flash reduction maintenance system mode in the control line. The control line may include at least one control signal circuit component in the control line, and more specifically may include a first control signal circuit component and a second control signal circuit component, with the switch being operable to selectively connect or disconnect one of the first control signal circuit component and the second control circuit component to enable respectively different arc flash reduction maintenance system modes. A plurality of current limiters may be respectively connected in series with each one of the plurality of pyrotechnic disconnect modules between the first and second terminals of the pyrotechnic disconnect assembly. The plurality of current limiters may be bare current limiters comprising a multi-layer perforated body, the system further comprising an arc extinguishing media surrounding the bare limiters.

The control line may optionally be connected in parallel to the first and second terminals of the pyrotechnic disconnect assembly. A switch may be provided in the control line to selectively enable or disable at least one arc flash reduction maintenance system mode in the control line, and may be selected from the group of a varistor, a high pass filter, a low pass filter, a resistor, a breakdown capacitor, Zener diode, an insulated gate bipolar transistor (IGBT), or equivalents and combinations thereof. The control line may further include first and second control signal circuit components, with the switch being operable to connect and disconnect each of the first and second control signal circuit components in the control line to provide respectively different arc flash reduction maintenance system modes.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An arc flash reduction maintenance system comprising:
    a pyrotechnic disconnect assembly comprising:
        a housing;
        first and second terminals extending from an exterior of the housing; and
        a plurality of pyrotechnic disconnect modules inside the housing and connected in parallel between the first and second terminals, wherein each of the plurality of pyrotechnic disconnect modules include first and second electrical connectors, and a pyrotechnic disconnect element electrically connected to at least one of the first and second electrical connectors and configured to sever an electrical connection of the each of the plurality of pyrotechnic disconnect modules through release of energy stored in the pyrotechnic disconnect element;
    a control line connected to one of the plurality of pyrotechnic disconnect modules and in parallel with one of the pyrotechnic disconnect assembly and an overcurrent protection device, the control line providing a self-generating control signal to cause the one of the plurality of pyrotechnic disconnect modules to electrically isolate the overcurrent protection device; and
    a plurality of current limiters respectively connected in series with each one of the plurality of pyrotechnic disconnect modules between the first and second terminals of the pyrotechnic disconnect assembly,
    wherein the control line is connected in parallel to the first and second terminals of the pyrotechnic disconnect assembly.

2. The system of claim 1, further comprising a switch located in the control line to selectively enable or disable at least one arc flash reduction maintenance system mode in the control line, wherein the control line further includes at least one control signal circuit component in the control line.

3. The system of claim 1, further comprising a switch located in the control line to selectively enable or disable at least one arc flash reduction maintenance system mode in the control line, wherein the control line further includes a first control signal circuit component and a second control signal circuit component, the switch operable to selectively connect or disconnect one of the first control signal circuit component and the second control signal circuit component to enable respectively different arc flash reduction maintenance system modes.

4. The system of claim 1, wherein the plurality of current limiters are bare current limiters comprising a multi-layer perforated body, the system further comprising an arc extinguishing media surrounding the bare current limiters.

5. The system of claim 1, further comprising a switch in the control line to selectively enable or disable at least one arc flash reduction maintenance system mode in the control line.

6. The system of claim 5, further comprising at least one control signal component in the control line, the at least one control signal component selected from the group of a varistor, a high pass filter, a low pass filter, a resistor, a breakdown capacitor, Zener diode, an insulated gate bipolar transistor (IGBT), and combinations thereof.

7. The system of claim 1, wherein the control line further includes first and second control signal circuit components, and a switch operable to connect and disconnect each of the first and second control signal circuit components in the control line to provide respectively different arc flash reduction maintenance system modes.

* * * * *